Oct. 28, 1941.  H. E. DAVIES  2,260,704
EXHAUST COLLECTOR
Filed Dec. 20, 1939    3 Sheets-Sheet 1

INVENTOR.
Henry E. Davies
BY
ATTORNEY.

Oct. 28, 1941.  H. E. DAVIES  2,260,704
EXHAUST COLLECTOR
Filed Dec. 20, 1939   3 Sheets-Sheet 2
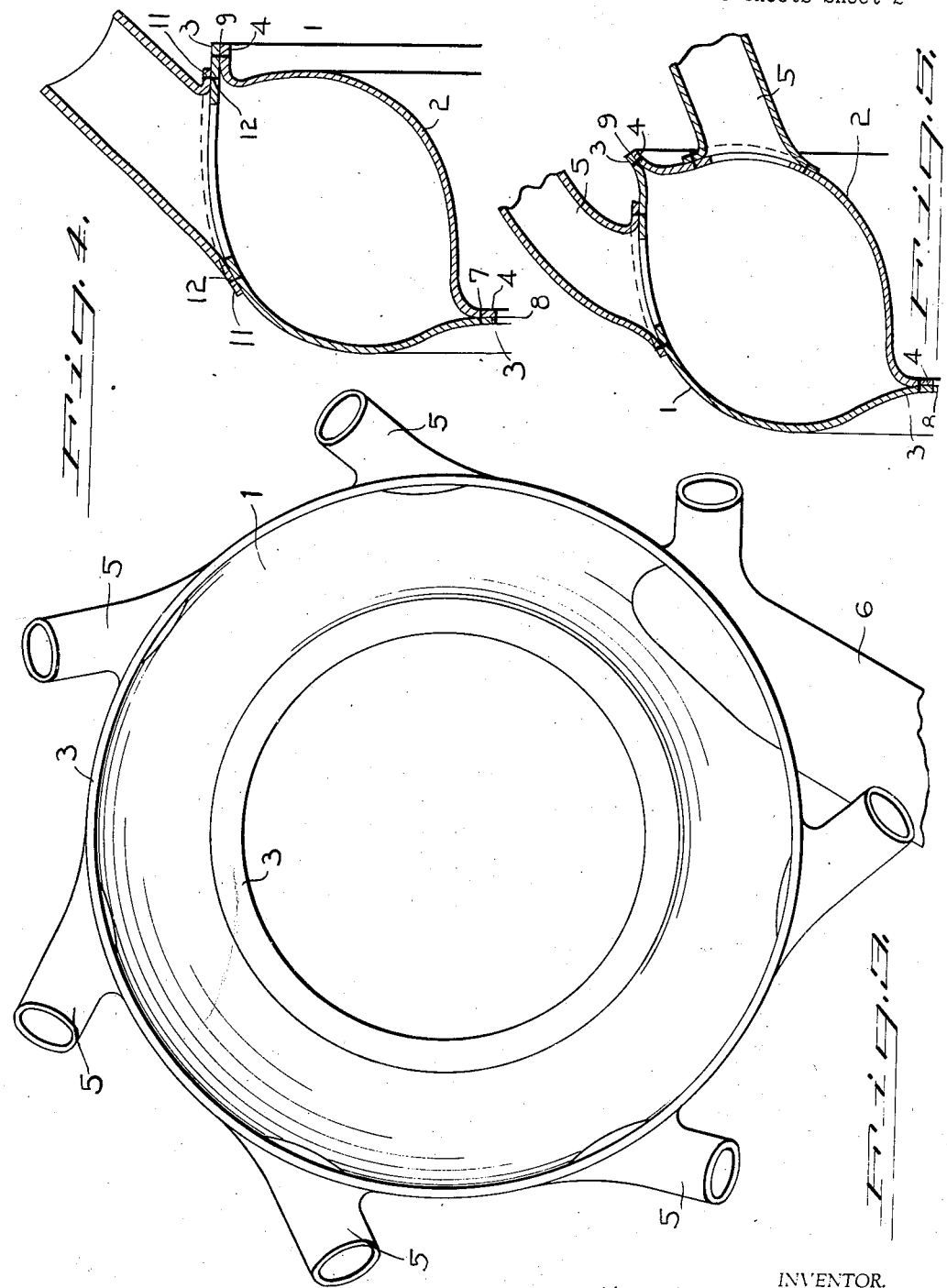
INVENTOR.
Henry E. Davies,
BY
ATTORNEY.

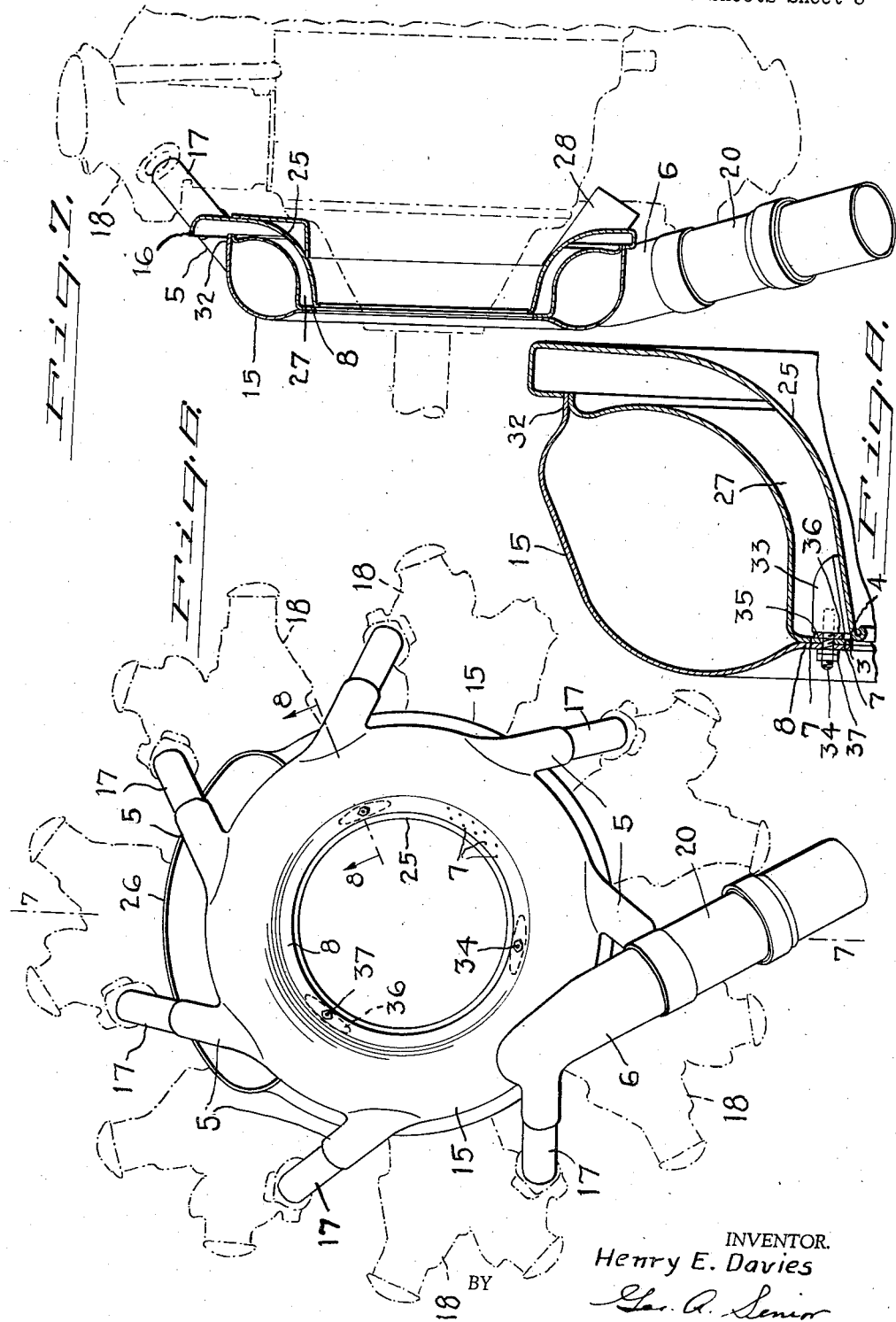

Patented Oct. 28, 1941

2,260,704

UNITED STATES PATENT OFFICE 2,260,704

EXHAUST COLLECTOR

Henry E. Davies, Hasbrouck Heights, N. J., assignor to Pollak Manufacturing Company, Arlington, N. J., a corporation of New Jersey Application December 20, 1939, Serial No. 310,123

4 Claims. (Cl. 123—122)

The invention relates to exhaust manifold collectors of the type particularly adaptable for use with radial type aircraft engines.

Exhaust manifold systems of this type comprise a collector ring or hollow annular member having a plurality of branch pipes, depending upon the number of cylinders in the engine and a tail pipe or outlet pipe. The branch pipes connect with other pipes leading from the exhaust outlets of the engine cylinders and the tail pipe leads from the collector ring to atmosphere or to other suitable connections to atmosphere. While a hollow annular member has been referred to, in some instances, depending upon the type of engine and arrangement of its parts, an exhaust collector of two or more sections, either separate or connected could be utilized and the invention would be applicable thereto.

In systems of the aforesaid description, the hollow annular member or its parts, if not made in one unit, are formed in two halves and welded together, generally by a butt weld made by an oxy-acetylene torch. After the hollow annular member has been completed suitable apertures are cut therein for the branch pipes and tail pipe and these connections are welded to the annular member. Ofttimes the welds for the branch pipes or the tail pipe will cross the welds for joining the two halves of the annular member together.

Manifold systems of this type are usually made of comparatively thin light weight metal and it is well known that torch welding distorts the metal and sets up internal strains and unbalanced stresses. This is particularly true where the metal has been through a severe drawing or heavy stamping process. In the high speed radial type aircraft engine intense heat is developed, and as a substantial part of this heat enters the exhaust manifold system the result is that manifold systems built as described soon crack and break down with very troublesome and sometimes disastrous results.

The principal object of the present invention is to provide a manifold system so constructed as to offer great durability and one that will be substantially free from all internal strains and unbalanced stresses.

A further object is to provide a manifold system that is rugged in its construction.

Another object is to produce a manifold system that is economical to manufacture and one in which any and all faults may be easily corrected during the manufacturing stages.

In accordance with the invention, the manifold or collector ring is made in two parts or halves and each half is provided with an extending flange on each edge. These flanges are placed face to face in contact with each other and are secured together by resistance welding. The flanges in addition to giving great strength to the collector ring may be utilized to perform various other important duties. The resistance welding of the flanges practically eliminates all internal strains and unbalanced stresses.

Numerous other objects and advantages will become apparent as this specification proceeds. Referring to the drawings forming a part thereof and in which different forms of the invention are illustrated:

Fig. 3 is an elevational view looking in at the front half of the manifold collector ring before the rear half has been attached or welded thereto;

Fig. 4 is a detail sectional view on a larger scale, taken on line 4—4 of Fig. 1;

Fig. 5 is a detail sectional view showing a slightly different form of the invention;

Fig. 6 is an elevational view illustrating one form of the invention applied to a radial-type aircraft engine;

Fig. 7 is a sectional view taken on the line 7—7 of Fig. 6; and

Fig. 8 is a detail sectional view on a larger scale and taken on line 8—8 of Fig. 6.

Figures 1, 2:
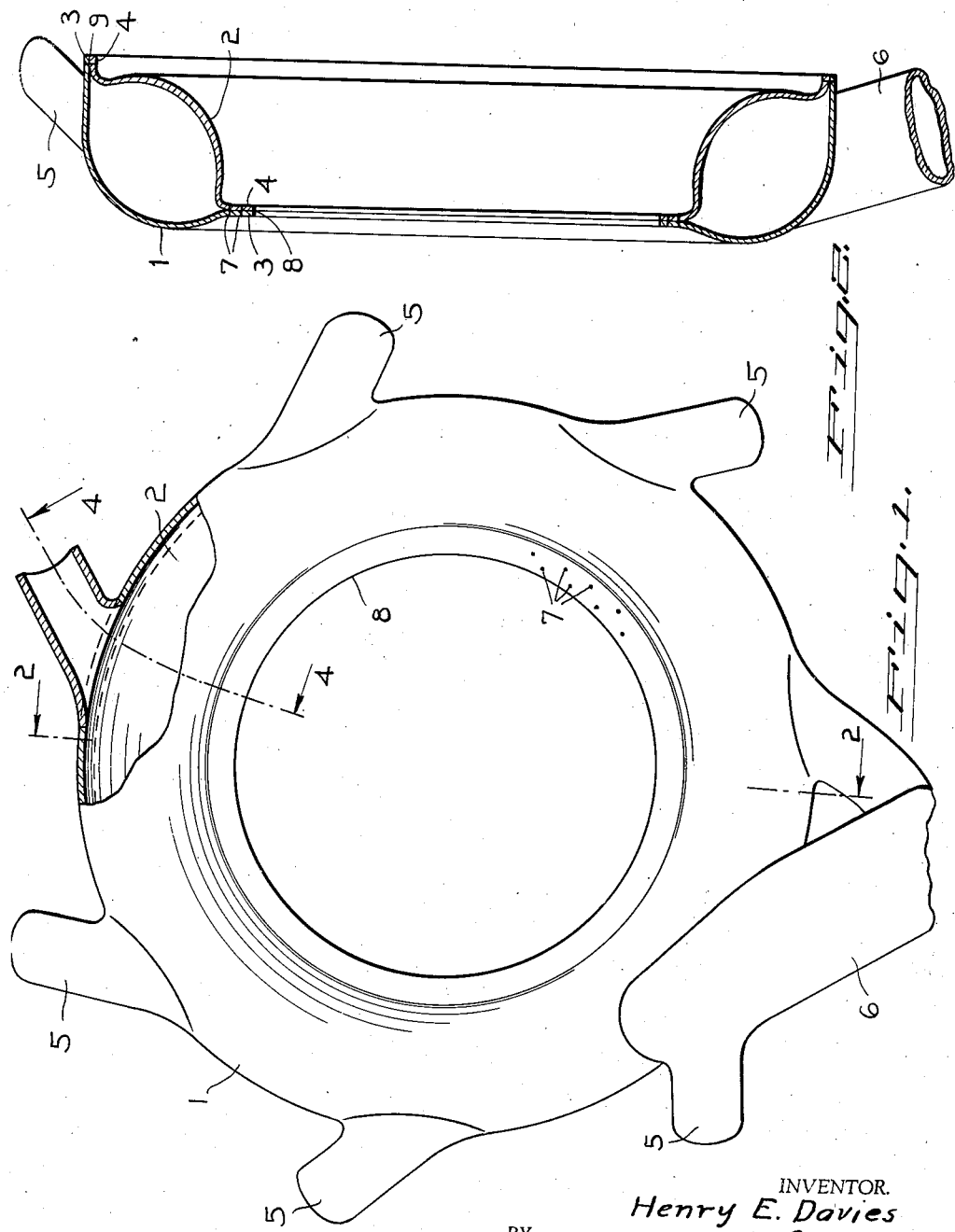
Fig. 1 is an elevational view with parts broken away and in section of the manifold collector ring with its branch pipes and tail pipe, constructed in accordance with the present invention.
Fig. 2 is a sectional view taken on line 2—2 of Fig. 1.

Referring again to said drawings and particularly to Figures 1 to 4, the two elements or halves of the hollow annular member or collector ring are designated by the reference numerals 1 and 2. The front half 1 has flanges 3 on both its edges and the rear half 2 has flanges 4 on its edges.

As shown in Figures 1 to 4 the branch pipes 5 and tail pipe 6 are welded to the front half 1 of the annular hollow member. As heretofore stated it is customary to weld the two halves together and cut apertures in the completed ring for the branch pipes and tail pipe and weld these members therein. Ofttimes the welds are faulty and the only way to correct them is to work from the inside of the hollow annular member. Obviously this is impossible and the imperfect welds and internal strains and unbalanced stresses set up by the annular welds and the welds of the branch pipes and tail pipe soon cause the manifold system to break down and disintegrate.

As illustrated in Figures 1 to 4 the branch pipes and tail pipe are welded to the front half 1 of the ring and these welds may be thoroughly inspected and tested before the rear half 2 of the collector ring is welded to the front half. It is to be understood that the rear half and front half are spoken of only in terms of orientation as in some types of manifold collector systems the branch pipes and tail pipe might be secured to the rear half or in other installations some of the branch pipes might be secured to one half and some to the other half as shown in Fig. 5.

After the branch pipes and tail pipe have been welded in position the flanges 3—4, 3—4 are placed face to face in contact with each other and are secured together by resistance welding indicated at 7 in Figs. 1 and 2. Thus two rigid substantial double-walled flanges 8 and 9 are formed.

The flanges 3—3 and 4—4 have not been materially disturbed by the drawing process utilized in forming the two halves and it is well known that resistance welding does not set up the stresses and strain that torch welding does. The result is that a manifold collector system has been produced in which practically all internal strains and unbalanced stresses are eliminated.

The double-walled flanges 8 and 9 add great strength to the collector ring and in addition serve other useful functions as will be hereinafter apparent.

The branch pipes and tail pipe may be secured in place by torch welding or as illustrated in Fig. 4 they may also be secured by resistance welding, the branch pipes having flanges indicated at 11 and the resistance welding being designated 12.

Reference will now be had to Figs. 6, 7 and 8 which show one of the numerous applications of the invention. The exhaust manifold system is illustrated in these figures in conjunction with one form of cowling. Part of the outer wall of the hollow annular member or manifold collector ring in conjunction with the cowling provides a chamber for heating the air to be fed to the carbureter. The flange 8 provides an efficient means for sealing the front space between the manifold collector ring and the cowling and at the same time provides a mounting means for supporting the manifold collector ring and its component parts.

In operation the engine develops a great amount of heat and very substantial stresses and strains are set up in the exhaust collectors due to expansion and contraction of the metals. This very often results in breaking down of the parts, particularly with which this invention has to do, the results being most troublesome.

The reference numeral 15 designates the hollow annular member which is made of comparatively light sheet metal and is somewhat circular in cross section. The branch pipes 5, as heretofore described are welded to the hollow annular member 15 and are loosely connected to other pipes 17 leading from the exhaust outlets of the engine cylinders 18, indicated in broken lines. The tail pipe or outlet pipe 6 is likewise welded to hollow annular member and an additional length of pipe 20 is suitably secured to the tail pipe and leads to atmosphere.

The hollow annular member 15 is mounted in close proximity to the engine and between it and the engine is located a cowling 25 which is secured to the engine in any convenient manner. The upper central part of the cowling is raised as indicated at 26 to trap the air which enters the annular chamber 27 between the cowling and the hollow annular member. The air is heated in this chamber and passes from the chamber through a pipe 28 leading to the carbureter.

The space between the front edge of the cowling 25 and the hollow annular member must be sealed to complete the annular air chamber 27. In ordinary practice a plurality of substantial lugs are welded to the hollow annular member and a closure ring is secured to these lugs. A great deal of trouble results from this construction. The expansion due to heat is substantially different in the heavy metal lugs and the light metal in the hollow annular member. This results in cracking or breaking of the hollow annular member in the region of the lugs.

As heretofore stated the hollow annular member is made in two halves and is provided with the flange 8, formed from the inward annular extensions or flanges which are united together by resistance welding 7. Thus an efficient sealing ring is provided and the hollow annular member or manifold collector ring is strengthened instead of being weakened. The flat flanges readily lend themselves to resistance welding which is much more economical than torch welding ordinarily utilized. While the construction as illustrated is preferred other constructions are not precluded, such for instance as a flange extending from only one of the two parts forming the manifold collector ring or a separate ring continuously welded to the manifold.

In the form of the invention shown in Figs. 6, 7 and 8 the other edges 32 of the hollow annular member may be secured together by a torch weld. Obviously the flange 9 at this region might be utilized to form the top closure for the air chamber 27 except at the area where the air is admitted to the chamber.

The flange 8 in addition to acting as a sealing ring provides a mounting means for the exhaust collector. Lugs 33, see Fig. 8, are welded or otherwise secured to the cowling and are provided with threaded studs 34 projecting outwardly therefrom. The studs pass through suitable openings 35 in the flange and nuts 37 are applied. Small reinforcing plates 36 are provided in the region of the openings 35 largely to insure against wearing of the holes 35.

As illustrated the hollow annular member is made up as a unit and the branch pipes and the tail pipe are secured to either one of the halves thereof. Obviously the hollow annular member might be made in two or more parts, each part taking care of a certain number of branch pipes and having its own tail pipe. Under other conditions, depending upon the type of engine, the hollow annular member might be an incomplete ring. Under still other conditions the hollow annular member might be made up of a plurality of sections suitably joined together. Likewise the branch pipes might be secured to one half of the collector ring and the tail pipe secured to the other half.

Under all of the foregoing conditions the advantages of the invention would be inherent, that is, welding the branch pipes and tail pipe to either of the elements or halves of the annular collector ring, all parts remaining accessible for inspection and correction until final assembly of said annular elements by a method of welding which introduces no unbalanced stresses and therefore causes no distortion or dimensional inaccuracies in the completed structure. While the words half or halves have been used in numerous occasions throughout the specification and claims it is to be understood the use of these words is only a matter of phraseology as the two annular elements in numerous installations might be widely different from each other both as to dimensions and configuration.

Such changes in details of construction and arrangement of parts as would occur to one skilled in the art are to be considered as coming within the spirit of the invention as set forth in the appended claims.

I claim:

1. An exhaust collector system for a radial type aircraft engine, said system having in combination, a cowling mounted on the forward part of said engine, a hollow annular member formed in two halves and being spaced away from said cowling so as to form an air chamber, branch tubes welded to either of the halves of said hollow annular member and leading from said hollow annular member to the engine cylinders, an outlet pipe secured to one of the halves of said hollow annular member and leading from said hollow annular member, and a pair of double-walled flanges forming part of said hollow annular member, one of said double-walled flanges extending inwardly into the space defined by said hollow annular member, said flange acting as a sealing ring to close the space between said hollow annular member and the front of the cowling, and in addition providing a mounting means for supporting the exhaust collector.

2. An exhaust collector having in combination, a hollow annular member, branch tubes leading from said hollow annular member to the engine cylinders, an outlet pipe leading from said hollow annular member, and an annular flange forming part of said hollow annular member and extending inwardly into the space defined by said hollow annular member, said flange acting as a sealing ring to close the space between said hollow annular member and the front of the cowling, and in addition providing a mounting means for supporting said exhaust collector.

3. In a device of the character described, a cowling, a hollow annular member spaced away from said cowling so as to form an air chamber between said cowling and said hollow annular member, a continuous annular flange formed as part of and extending into the space defined by said hollow annular member, said flange closing the space between the forward edge of said cowling and said hollow annular member to act as a seal for said air chamber, and means carried by the forward edge of said cowling to cooperate with said flange so as to function as a supporting means for said hollow annular member.

4. In a device of the character described, a cowling, a hollow annular member spaced away from said cowling so as to form an air chamber between said cowling and said hollow annular member, a continuous annular double-walled flange formed by flanges extending inwardly from said hollow annular member, said double-walled flange closing the space between the forward edge of said cowling and said hollow annular member to act as a seal for said air chamber, lugs secured to said cowling adjacent its forward edge and studs extending forwardly from said lugs, said studs cooperating with suitable openings in said double-walled flange, said flange thus acting as a supporting means for said hollow annular member and its component parts.

HENRY E. DAVIES.